United States Patent [19]

Hilby et al.

[11] Patent Number: 4,915,512
[45] Date of Patent: Apr. 10, 1990

[54] THRUST BEARING WITH A MAGNETIC FIELD SENSOR

[75] Inventors: James A. Hilby, Watertown; Alfred J. Santos, Canton Center, both of Conn.

[73] Assignee: The Torrington Company, Torrington, Conn.

[21] Appl. No.: 328,210

[22] Filed: Mar. 24, 1989

[51] Int. Cl.$^4$ ............................................. F16C 19/30
[52] U.S. Cl. ................................... 384/446; 384/448; 384/622
[58] Field of Search ............... 384/446, 448, 621, 622, 384/618, 615

[56] References Cited

U.S. PATENT DOCUMENTS

| 4,688,951 | 8/1987 | Guers | 384/448 |
| 4,732,494 | 3/1988 | Guers et al. | 384/446 |
| 4,783,180 | 11/1988 | Hayashi | 384/446 |

Primary Examiner—Lenard A. Footland
Attorney, Agent, or Firm—Frank S. Troidl

[57] ABSTRACT

One thrust race of a two-race thrust bearing has a magnetic field sensor mounted on a lip extending axially from the outside diameter of the thrust race. The other thrust race has a magnetic field source. The race with the magnetic field source rotates; the race with the sensor is fixed. The number of times alternate magnetic poles on the rotating thrust race is sensed by the sensor per unit of time indicates the speed of the rotating thrust race.

5 Claims, 2 Drawing Sheets

THRUST BEARING WITH A MAGNETIC FIELD SENSOR

This invention relates to thrust bearings. More particularly, this invention is a new thrust bearing using a magnetic field source and a magnetic field sensor for determining the rotational speed of a rotating thrust race with respect to an opposed fixed thrust race.

Current electronic speed sensors consist of two independent components whose sole purpose is to sense speed. Typically, a magnetic field source is pressed onto a specially prepared shaft and a sensor is positioned with respect to the magnetic field source. Some problems with these systems are that they are relatively large, special piloting provisions need to be made, and exact adjustments of the magnetic field source and the sensor need to be made at installation for proper performance. Many manufacturers of mechanical and electrical systems apportion only a very limited axial and radial space for thrust bearings. For example, manufacturers of vehicle transmissions in modern day vehicles apportion an extremely limited axial space for a thrust bearing to be inserted and used to indicate the transmission output speed.

Clearly, it is extremely important that thrust bearings be made which are very compact and take up very little space, especially in the axial direction, yet function properly, require minimum or no adjustment of the magnetic field source and the magnetic field sensor at installation, and not lose pilot upon axial movement of one thrust race with respect to the other thrust race.

This invention is a new thrust bearing which requires a minimum of axial and radial space.

Briefly described, the thrust bearing comprises a first thrust race having a radially extending annular portion and a second thrust race having a radially extending annular portion axially separated from the radially extending annular portion of the first thrust race. The thrust races have opposed radially extending annular raceways. Each raceway extends partially along the respective radially extending annular portion of the thrust race. Rolling members roll on the raceways. The first thrust race radially extending annular portion has a magnetic field source radially separated from the rolling members. The second thrust race has at least one lip extending axially from the outside diameter of its radially extending annular portion and away from the first thrust race. A sensor mount is supported by and piloted by the lip. A sensor is mounted on the sensor mount and faces the magnetic field source on the first thrust race. The invention, as well as its many advantages, may be further understood by reference to the following detailed description and drawings in which:

In the various figures, like parts are referred to by like numbers.

Figure 1:
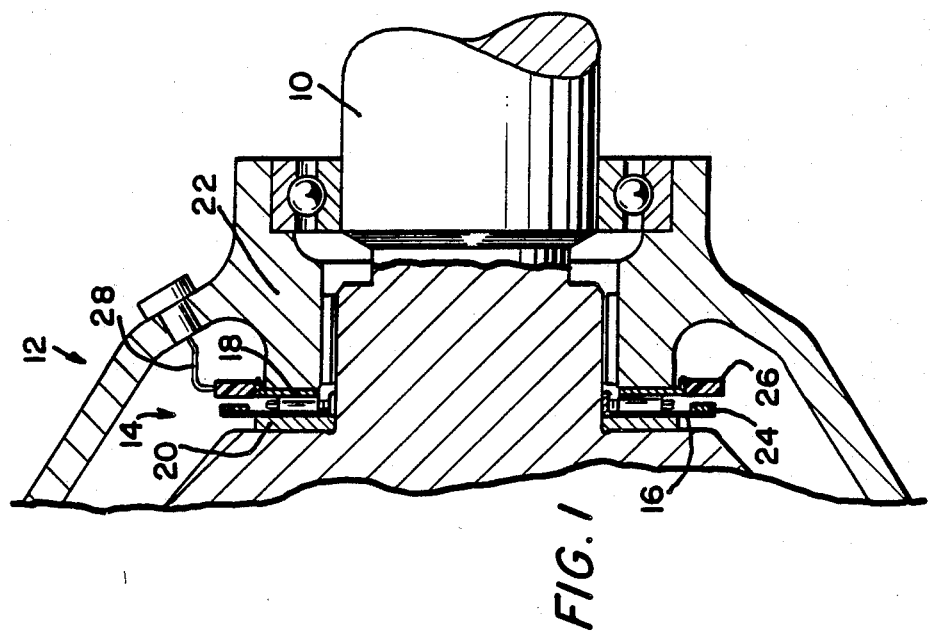
FIG. 1 is a fragmentary view of an automobile transmission output with the thrust bearing installed in the transmission.

Referring to the drawings and more particularly to FIG. 1, a rotatable shaft 10 is located within the stationary housing 12. A thrust bearing 14 having a first thrust race 16 and a second thrust race 18 is mounted in the housing with the backside of the thrust race 16 contacting a shim 20 and the backside of the thrust race 18 contacting the back plate 22. Thrust race 16 rotates at the same speed as the shaft 10. Thrust race 18 is fixed on the back plate 22.

An annular magnetic field source 24 is mounted on the surface of thrust race 16 which faces thrust race 18. A sensor mount 26 is mounted on the thrust race 18. A sensor 40 (see FIG. 3) located in sensor mount 26 senses the number of times the alternate North and South magnetic poles of the magnetic field source 24 pass by the sensor thus indicating the speed at which the shaft 10 is rotating. The electric signals from the sensor are conducted through line 28.

Figure 2:
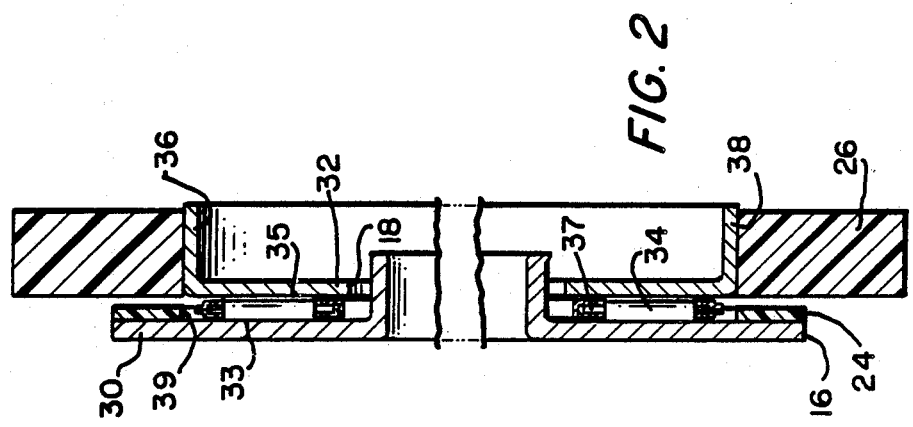
FIG. 2 is a sectional view of a two-lipped embodiment of the invention, the section being taken through the two lips.

Referring to FIG. 2, the thrust race 16 has a radially extending annular portion 30. The second thrust race 18 has a radially extending annular portion 32 axially separated from the radially extending annular portion 30 of the first thrust race 16. The thrust races have opposed radially extending annular raceways 33 and 35 on annular portions 30 and 32, respectively.

Rolling members such as rollers 34 in cage 37 roll on the raceways. The outside diameter of annular portion 30 of race 16 is sufficiently larger than the outside diameter of cage 37 so that the annular magnetic field source 24 radially inside surface 39 is radially separated from cage 37.

Figure 4:
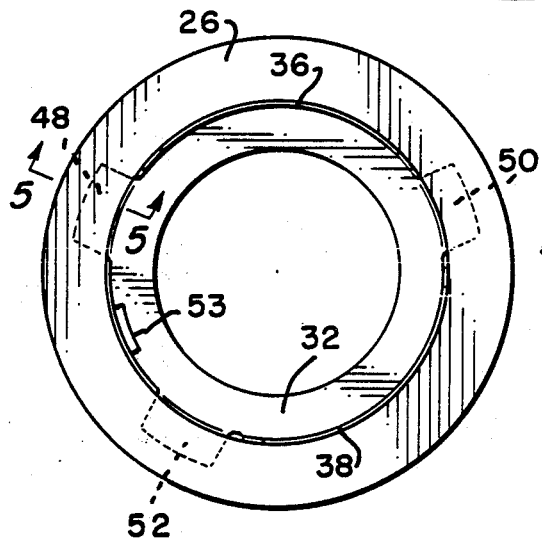
FIG. 4 is a back view of the surfaces of the thrust race and sensor mount of FIG. 3.

Referring to FIG. 2 and FIG. 4, a pair of circumferentially separated lips 36 and 38 extend axially from the outside diameter of the radially extending annular portion 32 and away from the first thrust race 16.

The sensor mount 26 is supported by the lips 36 and 38. The sensor mount 26 is also guided or piloted by the lips 36 and 38 so that the sensor mount 26 is kept coaxial with the second thrust race 18. Lips 36 and 38 perform the important function of preventing relative radial movement of the sensor mount with respect to the second thrust race.

Figure 3:
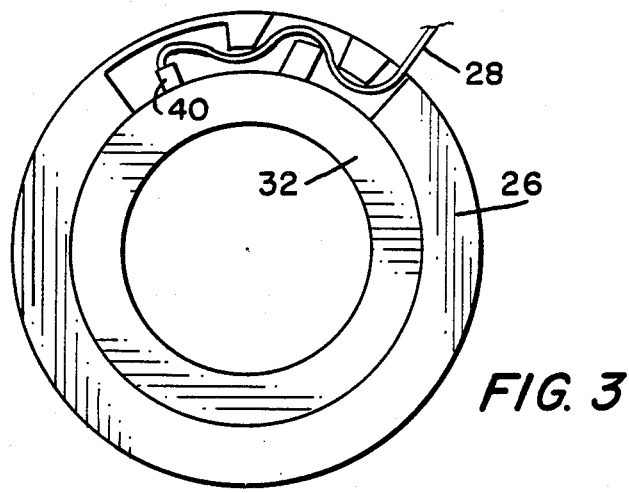
FIG. 3 is a front view of the surfaces of the thrust race and sensor mount which face the other thrust race.

Referring to FIG. 3, a magnetic field sensor such as a Hall sensor 40 is mounted on the sensor mount 26 and directly faces the magnetic field source 24 on the thrust race 16.

Figure 5:
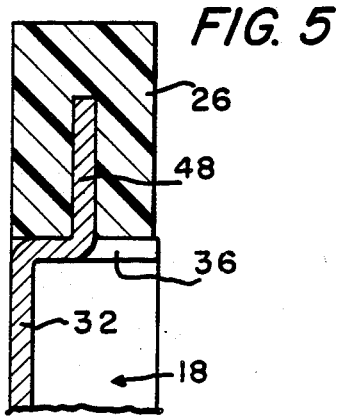
FIG. 5 is a sectional view taken along lines 5—5 of FIG. 4 and in the direction of the arrows.

Referring to FIG. 4 and FIG. 5, the thrust race 18 has a plurality of circumferentially separated tabs 48, 50, and 52 which extend radially from the outside diameter of annular portion 32 into the sensor mount 26.

The tabs fit snugly within the sensor mount 26 to prevent rotation of the sensor mount 26 with respect to the thrust race 18 and to prevent axial separation of the sensor mount and the thrust race.

The arc separating tabs 48 and 50 subtend a central obtuse angle; the arc separating tabs 50 and 52 subtend a central obtuse angle and the arc separating tabs 52 and 48 subtend a central acute angle. The tabs are positioned to make certain the sensor mount is mounted on the lips 36 and 38 with the sensor in a predetermined circumferential position. Referring to FIG. 1, the predetermined circumferential position of the sensor is such that the wiring 28 follows the shortest path from the sensor to the housing 12.

Tab 53 (see FIG. 4) fits into a notch (not shown) in the back plate 22 (see FIG. 1) to prevent rotation of the thrust plate 18 on the back plate 22.

Figure 6:
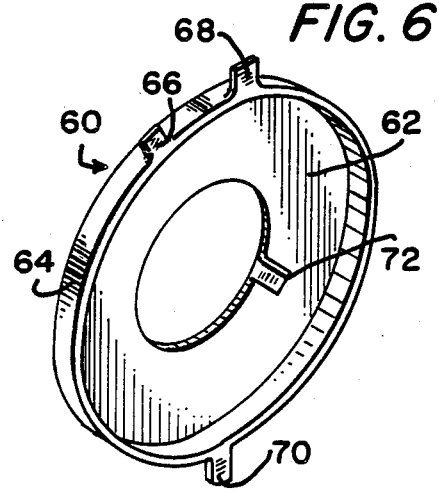
FIG. 6 is a perspective view of a second embodiment of thrust race for mounting and piloting the sensor mount using a single lip rather than two lips as is the case with the embodiment of FIGS. 1 through 5.

In the embodiment of FIG. 6, the thrust race 60 may be used instead of the thrust race 18 of FIGS. 1 through 5. The thrust race 60 has a radially extending annular portion 62. A single cylindrical lip 64 extends axially from the outside diameter of the radially extending annular portion 62 and away from the first thrust race. Circumferentially separated tabs 66, 68, and 70 extend outwardly from the axial open end of the cylindrical lip 64. The arc between tabs 66 and 68 subtend and acute central angle; the arcs separating tab 66 from tab 70 and separating tab 68 from tab 70 each subtend an obtuse central angle. An anti-rotation tab 72 on the inside diameter of the annular portion 62 fits into a groove (not shown) provided in the back plate 22 (see FIG. 1).

No adjustment of the sensor relative to the magnetic field source is required with this thrust bearing. The precision of the rollers and raceways are such that the air gap between the magnetic field source and the sensor is within the functional range of the Hall sensor. The lip or lips on the outside diameter of the annular portion of the fixed race serves a number of functions. Firstly, it is a natural pilot for the sensor mount so that a separate piloting surface is not required. Secondly, it positions the sensor radially outwardly from the roller path so that there is little or no change in the axial length of the thrust bearing, thus keeping the axial length of the thrust bearing to a minimum. Thirdly, the length of the lip or lips prevents the race from moving radially with respect to the sensor mount.

The radially outwardly extending tabs also serve a number of functions. They keep the sensor mount from rotating on the race and prevent axial separation of the sensor mount from the race.

In operation, as the shaft 10 rotates, the thrust race 16 will rotate at the same speed. As the alternate North pole-South pole magnetization on the magnetic field source 24 passes by the sensor 40, pulses are conducted through wiring 28 from the sensor 40. The speed of the shaft 10 is proportional to the number of pulses per unit of time.

We claim:

1. A thrust bearing comprising: a first thrust race having a radially extending annular portion; a second thrust race having a radially extending annular portion axially separated from the radially extending annular portion of the first thrust race; the radially extending annular portions having opposed radially extending annular raceways; rolling members adapted to roll on the raceways; the first thrust race radially extending annular portion having a magnetic field source radially outwardly separated from the rolling members; the second thrust race having at least one lip extending axially from the outside diameter of its radially extending annular portion and away from the first thrust race; a sensor mount supported by and piloted by the at least one lip; and a sensor mounted on the sensor mount and facing the magnetic field source on the first thrust race.

2. A thrust bearing in accordance with claim 1 wherein: the magnetic field source is an annular member attached to the radially extending annular portion of the first thrust race.

3. A thrust bearing in accordance with claim 2 wherein: there are two circumferentially spaced apart lips.

4. A thrust bearing comprising: a first thrust race having a radially extending annular portion; a second thrust race having a radially extending annular portion axially separated from the radially extending annular portion of the first thrust race; the radially extending annular portions having opposed radially extending annular raceways; roll-ing members adapted to roll on the raceways; the first thrust race radially extending annular portion having a magnetic field course radially outwardly separated from the rolling members; the second thrust race having at least one lip extending axially from the outside diameter of its radially extending annular portion and away from the first thrust race; a sensor mount supported by and piloted by the at least one lip; and a sensor mounted on the sensor mount and facing the magnetic field source on the first thrust race; and the second thrust race having at least one tab extending radially from its outside diameter and extending into the sensor mount, to prevent rotation of the sensor mount with respect to the second thrust race.

5. A thrust bearing in accordance with claim 4 wherein: there are three circumferentially unequally spaced tabs on the second thrust race.

* * * * *